United States Patent
Wu

(10) Patent No.: US 9,332,577 B2
(45) Date of Patent: May 3, 2016

(54) METHOD AND SYSTEM FOR IMPLEMENTING SMART CARD REMOTE OPERATION

(71) Applicant: HUIZHOU TCL MOBILE COMMUNICATION CO., LTD., Huizhou (CN)

(72) Inventor: Zhonghe Wu, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 84 days.

(21) Appl. No.: 14/395,888

(22) PCT Filed: Jun. 7, 2013

(86) PCT No.: PCT/CN2013/076897
§ 371 (c)(1),
(2) Date: Oct. 21, 2014

(87) PCT Pub. No.: WO2013/189245
PCT Pub. Date: Dec. 27, 2013

(65) Prior Publication Data
US 2015/0110028 A1    Apr. 23, 2015

(30) Foreign Application Priority Data
Jun. 21, 2012 (CN) .......................... 2012 1 0206396

(51) Int. Cl.
*H04L 12/28* (2006.01)
*H04W 76/02* (2009.01)
*H04W 4/00* (2009.01)
(Continued)

(52) U.S. Cl.
CPC .............. *H04W 76/02* (2013.01); *H04L 67/02* (2013.01); *H04W 4/003* (2013.01); *H04W 12/04* (2013.01); *H04L 69/16* (2013.01); *H04W 80/04* (2013.01); *H04W 80/06* (2013.01)

(58) Field of Classification Search
CPC ..... H04W 76/02; H04W 4/003; H04W 12/04; H04W 80/04; H04W 80/06; H04L 69/16; H04L 67/02
USPC .................................... 370/400–402; 713/168
See application file for complete search history.

(56) References Cited

U.S. PATENT DOCUMENTS

2007/0283412 A1* 12/2007 Lie ......................... H04L 63/20
726/1
2011/0296182 A1* 12/2011 Jia ......................... G06Q 20/32
713/168

FOREIGN PATENT DOCUMENTS

| CN | 101313622 A | 11/2008 |
| CN | 102067122 A | 5/2011 |
| CN | 102752375 A | 10/2012 |

OTHER PUBLICATIONS

Dong, Hui et al., Analysis of the Value-added Services Based on SCWS Technology, Information and Communications Technologies vol. 2, Apr. 15, 2011, ISSN 1674-1285 pp. 37-41.

*Primary Examiner* — Phuc Tran
(74) *Attorney, Agent, or Firm* — Shimokaji IP

(57) ABSTRACT

A method and system for implementing a smart card remote operation are provided. A mobile phone gateway, used for communication between a remote management server and a smart card, is set up in advance on a mobile phone. The mobile phone gateway communicates with a UICC by using a BIP protocol, sets up/closes a channel according to an instruction of the UICC, receives/transmits data, and is capable of synchronizing channel states. The remote management server monitors, in a sever mode, a local port by using a TCP/IP data stack, and provides an HTTP/HTTPS protocol access service. The remote management server transmits, as a client, a command and data to the local port. After a data packet is forwarded by the gateway to the UICC and is processed by an SCWS, the gateway carries out data inspection of a certain level and control encapsulation on a response of the UICC.

20 Claims, 2 Drawing Sheets

(51) Int. Cl.
*H04W 12/04* (2009.01)
*H04L 29/08* (2006.01)
*H04L 29/06* (2006.01)
*H04W 80/04* (2009.01)
*H04W 80/06* (2009.01)

METHOD AND SYSTEM FOR IMPLEMENTING SMART CARD REMOTE OPERATION

TECHNICAL FIELD

The present disclosure relates to smart card remote operation and data update, and in particular to, a method and system for implementing a smart card remote operation by using a bearer independent protocol (BIP) protocol and a smart card web server (SCWS).

BACKGROUND

At present, most subscriber identity modules (SIM) present mobile value-added services via a SIM card development kit menu, which is specifically implemented by utilizing over the air (OTA) technology through a short message channel. OTA is a technology which is based on a short message mechanism, and implements downloading, deleting and updating of a service menu in the SIM card through a mobile phone terminal and remote server. OTA technology enables a subscriber to acquire data value-added services of personalized information services. Due to the limit of a short message channel, data previously delivered by a SIM card and an OTA server uses bytes as a unit, which can only include a small quantity of text information such as a menu, an access number and the like. Short message channels have low data-carrying capacity and cannot download large application services. With the development of OTA technology, the capacity of the SIM card has been increased from level K to level M and level G. A SIM card can provide preset multiple applications by utilizing a large capacity card, so as to store files of various types such as multimedia and the like. Therefore, a remote server that interacts with large data files stored on a SIM card is desirable.

A smart card web server (SCWS) is a server built in a smart card, which may display files stored in the smart card to a subscriber in a web form according to requests of the subscriber. SCWS technology enables a mobile phone subscriber to conveniently look up multimedia files of a smart card provider through a web form. However, present SCWS specifications do not specify how to implement information interaction between a remote management server and a SCWS in a smart card. Furthermore, present SCWS specifications cannot implement remote control and remote data update. Moreover, present SCWS specifications cannot configure and customize mobile phone contents.

Therefore, the prior art still needs to be improved and developed.

SUMMARY

A method and system for implementing a smart card remote operation by using a BIP protocol and an SCWS is provided, which performs remote control and data update on a smart card through a remote management server, avoids unnecessary interactive negotiation with the smart card, and takes a mobile phone as a gateway to implement identity authentication, data integrity verification and customizable access policies.

A method for implementing a smart card remote operation by using a BIP protocol and an SCWS includes setting up a mobile phone gateway used for communication between a remote management server and a smart card on a mobile phone. The method also includes transmitting, by the remote management server, a short message for resetting a smart card web server SCWS to the mobile phone, and processing the short message, by the SCWS or a proxy program thereof, to obtain a communication request of the remote management server. The method further includes instructing, by the SCWS or the proxy program thereof, the mobile phone to start the mobile phone gateway through an SIM channel, monitoring and opening a local TCP/IP service port through the mobile phone gateway, and awaiting a connection to the remote management server. The method yet further includes locating, by the remote management server, an IP address of the mobile phone in the network, connecting, as a client, the TCP/IP service port monitored by the mobile phone gateway, and setting up a connection with the smart card. The method even further includes writing, by the remote management server, data to be transmitted into the smart card through the mobile phone gateway, and receiving data information fed back by the smart card through the mobile phone gateway.

According to the method, setting up a mobile phone gateway used for communication between a remote management server and a smart card on a mobile phone includes setting up, by the mobile phone gateway, an SIM channel used for communication with the smart card through a bearer independent protocol, and setting up a communication channel with the remote management server through an HTTP/IP protocol.

According to the method, writing data to be transmitted into the smart card through the mobile phone gateway and receiving data information fed back by the smart card through the mobile phone gateway includes performing, by the mobile phone gateway, recognition and authorization on the remote management server, and performing data verification on the data transmitted by the remote management server.

According to the method, after writing data to be transmitted into the smart card through the mobile phone gateway and receiving data information fed back by the smart card through the mobile phone gateway includes, the method further includes updating, by the remote management server, the smart card web server SCWS in a short message form to reconfigure the SIM channel, and instructing the mobile phone gateway to use a safe or an unsafe TCP/IP service port to perform data communication in a short message form.

According to the method, one remote management server corresponds with one or more SIM channels to perform synchronous update of data. According to the method, the smart card selects an HTTP/HTTPS to connect with the remote management server through the mobile phone gateway, wherein the header format of the HTTP/HTTPS needs to be negotiated and determined with the remote management server in advance.

In another embodiment, a system for implementing a smart card remote operation by using a BIP protocol and an SCWS includes a preset module, used for setting up a mobile phone gateway used for communication between a remote management server and a smart card on a mobile phone. The system also includes a startup processing module, used for controlling a smart card web server SCWS or a proxy program thereof to instruct the mobile phone to start the mobile phone gateway through an SIM channel according to a short message for resetting the SCWS transmitted by the remote management server to the mobile phone; monitoring and opening a local TCP/IP service port through the mobile phone gateway, and awaiting a connection to the remote management server. The system further includes a connection module, used for controlling the remote management server to locate an IP address of the mobile phone in the network, connecting, as a client, the TCP/IP service port monitored by the mobile phone gateway, and setting up a connection with the smart card. The system yet further includes a data update module, used for the remote management server to write data to be transmitted into the smart card through the mobile phone gateway, and receiving data information fed back by the smart card through the mobile phone gateway.

According to the system, the mobile phone gateway sets up an SIM channel used for communication with the smart card through a bearer independent protocol, and sets up a communication channel with the remote management server through an HTTP/IP protocol.

According to the system, the system further includes a recognition and authentication module, used for performing recognition and authorization on the remote management server through the mobile phone gateway, and performing data verification on the data transmitted by the remote management server.

According to the system, the system further includes a resetting module, used for the remote management server to update the smart card web server SCWS in a short message form to reconfigure the SIM channel, and instruct the mobile phone gateway to use a safe or an unsafe TCP/IP service port to perform data communication in a short message form.

According to the method and system for implementing a smart card remote operation, the mobile phone gateway used for communication between the remote management server and the smart card is set up in advance on the mobile phone; the mobile phone gateway communicates with a UICC by using a BIP protocol, sets up/closes a channel according to an instruction of the UICC, receives/transmits data, and is capable of synchronizing channel states. The remote management server monitors, in a sever mode, a local port by using a TCP/IP data stack, and provides an HTTP/HTTPS protocol access service. The remote management server transmits, as a client, a command and data to the local port. After a data packet is forwarded by the gateway to the UICC and processed by an SCWS, the gateway carries out data inspection of a certain level and control encapsulation on a response of the UICC, and packages the response into an HTTP/TCP datagram, to acknowledge a request from the remote management server. Thereby, remote control and management, and data updates are implemented for the smart card.

DETAILED DESCRIPTION

Various embodiments of methods and systems for implementing a smart card remote operation by using a bearer independent protocol (BIP) and a smart card web server (SCWS) are described with reference to the drawings The embodiments are included for illustrative purposes and are not intended to limit the scope of the claimed invention in any way.

Figure 1:
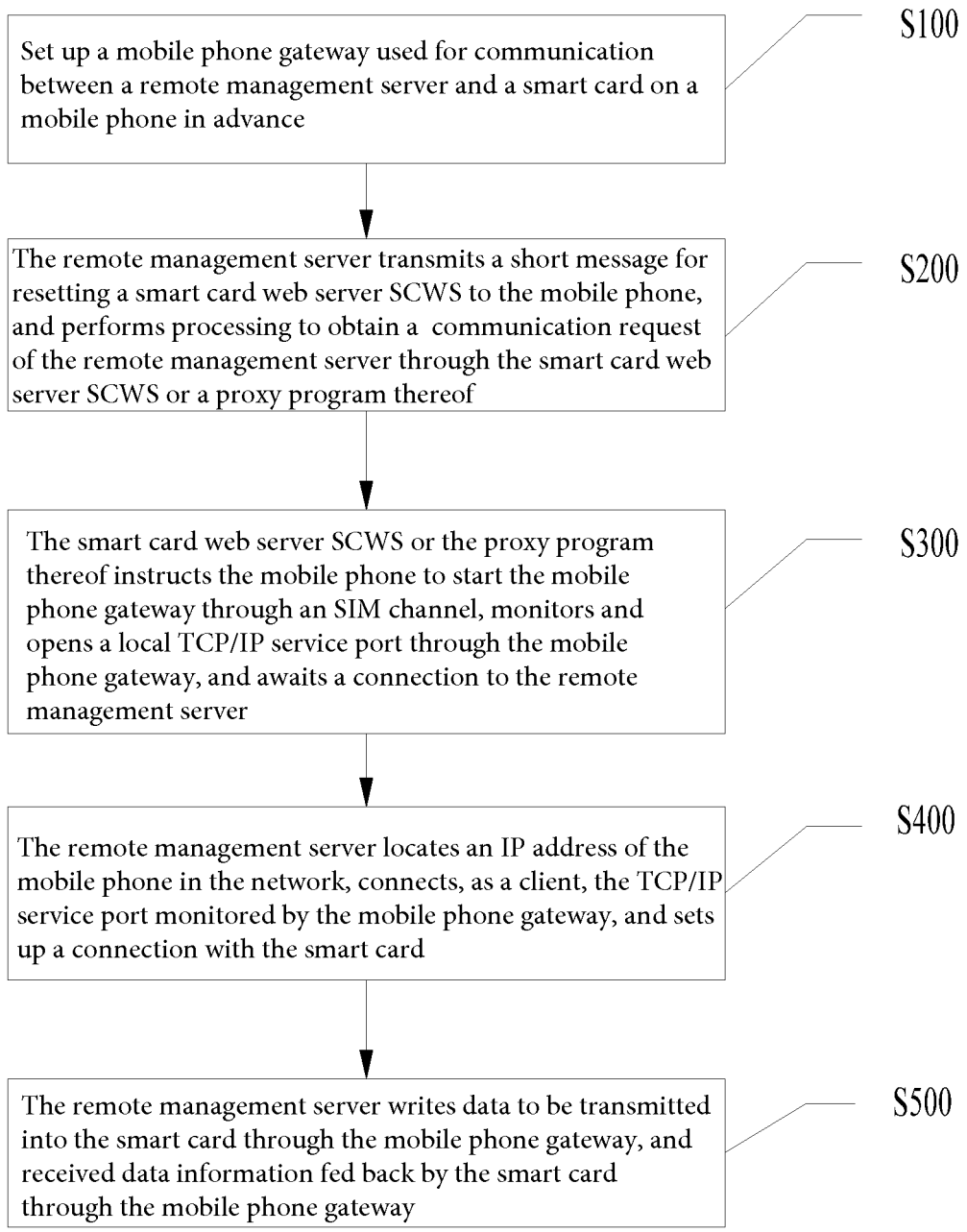
FIG. 1 depicts a flow chart of an example method for implementing a smart card remote operation according to the present invention.

Turning to FIG. 1, a method for implementing a smart card remote operation by using a BIP protocol and an SCWS is provided. As shown in FIG. 1, the method may include setting-up a mobile phone gateway, used for communication between a remote management server and a smart card, on a mobile phone (block S100). The remote management server may transmit a short message for resetting a smart card web server SCWS to the mobile phone, and may perform processing to obtain a communication request of the remote management server through the smart card web server SCWS or a proxy program thereof (block S200). The smart card web server SCWS, or the proxy program thereof, may instruct the mobile phone to start the mobile phone gateway through an SIM channel, may monitor and open a local TCP/IP service port through the mobile phone gateway, and may await a connection to the remote management server (block S300). The remote management server may locate an IP address of the mobile phone in the network, may connect, as a client, the TCP/IP service port monitored by the mobile phone gateway, and may set up a connection with the smart card. The remote management server may write data to be transmitted into the smart card through the mobile phone gateway, and may receive data information fed back by the smart card through the mobile phone gateway.

The foregoing steps will be described in detail with reference to specific embodiments hereinafter. The smart card of the present invention may be a universal integrated circuit card (UICC), which implements access permission authentication of the mobile phone terminal and network authentication through an application USIM (SIM) preset in the UICC card. Thus, mobile phone/SIM-card separation is implemented. A smart card may be referred to as a subscriber identity module (SIM) card. The smart card may be internally provided with an SCWS application. When the mobile phone is started, the mobile phone may initialize the UICC through an ISO/IEC7816 regulation. The mobile phone may select the SCWS application in the UICC, or the UICC, after being started, may automatically start the SCWS. An entrance path of the SCWS may be stored in a first layer of file of a root file of the UICC, and may be selected to start through an Application Identifier (AID) of the SIM card entry.

The mobile phone may support base commands: Terminal Profile, Envelope, Fetch and Terminal Response, required by a SIM card application tool. The mobile phone may further support a Proactive command related to BIP, each client mode of Open Channel, Send Data, Receive Data, Close Channel, as well as, Get Channel Status and the like. Communication between a remote management server and a smart card may be implemented by setting up a mobile phone gateway on a mobile phone. The remote management server may be a network carrier. The mobile phone gateway may communicate with the smart card through a bearer independent protocol (BIP) and the mobile phone gateway may communicate with the remote management server through an HTTP/IP protocol. The mobile phone gateway may serve as a proxy for data forwarding therein to implement data gateways of different protocol stacks. When the SIM card transmits a Receive Data Proactive Command APDU of the mobile phone, data fed through a TCP connection associated with the remote management server may be written in the SIM card, and a Terminal Response APDU may be sent to the SIM card through the mobile phone to verify the connection. With respect to a Send Data Proactive Command APDU, data to be sent to the remote management server by the SIM card may be read and verified through a Terminal Response APDU, and may be sent to the remote management server in an associated TCP connection.

A remote management server may send a short message, similar to a type of the SIM card, to a mobile phone, and the mobile phone may transfer the information to a UICC through an Envelope Application Protocol Data Unit (APDU). The UICC may parse the message related to a SCWS, may hand the message over to the SCWS, or a proxy program thereof, to process. The SCWS, or the proxy program thereof, may select an SIM channel (e.g., a basic channel or an expanded channel), may instruct the mobile phone, on the SID of the SIM channel, that one Proactive command needs to be processed. The mobile phone may use a Fetch APDU command to obtain the Proactive command. The mobile phone may start a mobile phone gateway according to the instruction, may open a local TCP/IP service port, may set up a server mode gateway, and may await a connection to the remote server, as a client, so as to perform data updates on the UICC.

An ENVELOPE APDU, of a UICC that interacts with the mobile phone, may have five basic units and a variable-length data combination. CLA, as used herein, refers to a command set and an ENVELOPE may belong to a UICC command set collection having, for example, a value of 80. INS, as used herein, refers to a command code and a command code value of the ENVELOPE may be C2. P1 and P2 are command parameters, and Lc is a data length and may be a SIM card short message, which may closely follow contents of a short message. The UICC, after receiving the APDU, may process the CLA and INS of the command, and may respond to a processing result. For example, a SW1 and a SW2 value of 90 XX, in a response state, may represent receiving a command and processing correctly.

A mobile phone gateway may set up a communication channel with a smart card through a bearer independent protocol (BIP), wherein each communication channel may be distinguished by using a different session identifier SID (i.e., all connection and access data of a client may be forwarded to a SID instructed by a corresponding UICC, and the SID may physically identify one SIM channel). When a remote management server manages a UICC, a PO-TCP (e.g., a PPG Originated TCP connection establishment method or a connection originated by a PUSH gateway) technology may be used to locate an IP address of a mobile phone in a network of a carrier (i.e., the remote management server and the TCP client may be connected with a service port monitored by the mobile phone gateway, thus setting up a connection with the UICC through a session channel of the mobile phone gateway and the SIM card).

A remote management server, after setting up a connection with a UICC, may send commands and data to the UICC through a mobile phone gateway, and data information fed back by the UICC may be transmitted to the remote management server through the mobile phone gateway, thus implementing remote management and data update of the remote management server on the UICC card. When the remote server and the UICC are in data communication, the mobile phone gateway may also perform recognition and authorization on the remote management server, and may perform data verification on data sent by the remote management server, so as to ensure security of data interaction.

The remote management server may also update a smart card web server SCWS in a short message form to reconfigure the SIM channel, and instruct a mobile phone gateway to use a safe, or an unsafe, TCP/IP service port to perform data communication in a short message form. The remote management server may send an SIM card type short message through a mature OTA short message technology. The mobile phone, after receiving the short message, may package the short message contents in an ENVELOPE type APDU, and may transfer short message content to the UICC through an interface defined by a European Telecommunications Standards Institute Smart Card Platform (ETSI SCP). The UICC may reconfigure the SCWS according to an instruction of the short message, and may instruct the mobile phone to monitor a service port through an Open Channel related to UICC Server Mode command according to new requirements, and may reconfigure the SIM channel, so as to give way for other applications or enhance security protection. Meanwhile, the remote management server may use a short message to instruct the mobile phone gateway to use a safe, or an unsafe, TCP/IP service port and a verification level of the connection. Thereby, different remote management servers may set up a plurality of channels for the UICC to perform synchronous update of data.

Further, during data update, the UICC may select an HTTP/HTTPS to connect with the remote management server, which may safely update bulk data contents including a stored user's manual, carrier yellow pages, advertisement information and the like. The request of the UICC may be submitted to the remote management server in a HTTP POST command form. A header structure format of the HTTP/HTTPS may be negotiated with the remote management server in advance, so as to prevent a third party from monitoring and forging. Digital certificate authentication may also be used as SIM card authentication because the SIM card authentication may lose effect sometimes, for example, when a WIFI is accessed.

With regard to a SIM card using a new standard of TS 102 600 of the European Telecommunications Standards Institute Smart Card Platform (ETSI SCP), if a mobile phone implements a USB-UICC interface, the SCWS may directly use a TCP/IP stack to connect to the remote management server, thus bypassing the BIP protocol, and updating the UICC data contents more effectively. Based on the foregoing method for implementing a smart card remote operation by using a BIP protocol and an SCWS, the present invention further provides a system for implementing a smart card remote operation by using a BIP protocol and an SCWS.

Figure 2:
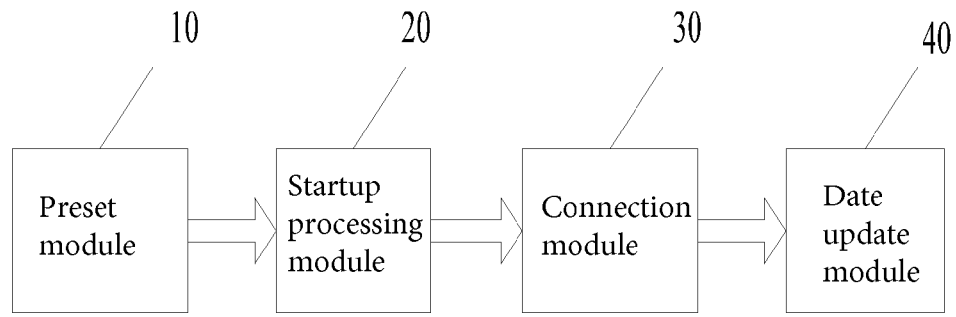
FIG. 2 depicts a structural schematic diagram of an example system for implementing a smart card remote operation according to the present application.

With reference to FIG. 2, a system may include a preset module 10, used for setting up a mobile phone gateway used for communication between a remote management server and a smart card on a mobile phone. The system may also include a startup processing module 20, used for controlling a smart card web server SCWS, or a proxy program thereof, to instruct the mobile phone to start the mobile phone gateway through an SIM channel according to a short message for resetting the SCWS transmitted by the remote management server to the mobile phone. The startup processing module 20 may be further used for monitoring and opening a local TCP/IP service port through the mobile phone gateway, and for awaiting a connection to the remote management server.

The system may further include a connection module 30, used for controlling the remote management server to locate an IP address of the mobile phone in the network, for connecting, as a client, the TCP/IP service port monitored by the mobile phone gateway, and for setting up a connection with the smart card. The system may yet further include a data update module 40, used for the remote management server to write data to be transmitted into the smart card through the mobile phone gateway, and for receiving data information fed back by the smart card through the mobile phone gateway.

Figure 3:
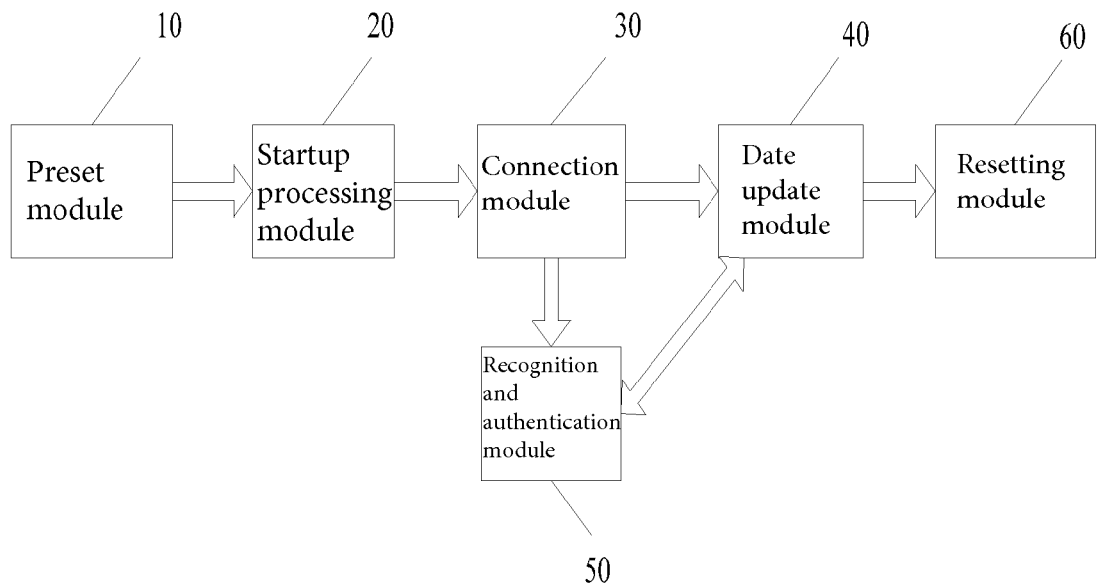
FIG. 3 depicts a structural schematic diagram of an example embodiment of a system for implementing a smart card remote operation according to the present invention.

Turning to FIG. 3, the system may further include a recognition and authentication module 50, used for performing recognition and authorization on the remote management server through the mobile phone gateway, and for performing data verification on the data transmitted by the remote management server. The system may also include a resetting module 60, used for the remote management server to update the smart card web server SCWS in a short message form to reconfigure the SIM channel, and to instruct the mobile phone gateway to use a safe, or an unsafe, TCP/IP service port to perform data communication in a short message form.

It should be understood that applications of the methods and systems for implementing smart card remote operation are not limited to the foregoing examples. For example, with respect to using a SIM card passing the new standards of the TS102600 of the European Telecommunications Standards Institute Smart Card Platform (ETSI SCP), if a mobile phone implements a USB-UICC interface, the SCWS may directly use a TCP/IP stack to connect to the remote management server, thus bypassing the BIP protocol, and updating the UICC data contents more effectively. All the improvements and transformation shall fall within the scope of the appending claims.

The invention claimed is:

1. A method for implementing a smart card remote operation by using a BIP protocol and an SCWS, the method comprising:
setting up a mobile phone gateway used for communication between a remote management server and a smart card on a mobile phone;
transmitting, by the remote management server, a short message for resetting a smart card web server SCWS to the mobile phone; and processing the short message, by the smart card web server SCWS or a proxy program thereof, to obtain a communication request of the remote management server;
instructing, by the smart card web server SCWS or the proxy program thereof, the mobile phone to start the mobile phone gateway, through an SIM channel, to monitor and open a local TCP/IP service port through the mobile phone gateway; and to await a connection to the remote management server;
locating, by the remote management server, an IP address of the mobile phone in the network;
connecting, as a client, the TCP/IP service port monitored by the mobile phone gateway and setting up a connection between the remote management server and the smart card; and
writing, by the remote management server, data to be transmitted into the smart card through the mobile phone gateway; and receiving data information fed back by the smart card through the mobile phone gateway.

2. The method according to claim 1, wherein setting UP a mobile phone gateway includes setting up, by the mobile phone gateway, an SIM channel used for communication with the smart card through a bearer independent protocol; and setting up a communication channel with the remote management server through an HTTP/IP protocol.

3. The method according to claim 1, wherein writing data to be transmitted into the smartcard includes
performing, by the mobile phone gateway, recognition and authorization on the remote management server, and performing data verification on the data transmitted by the remote management server.

4. The method according to claim 1, wherein one remote management server corresponds with one or more SIM channels to perform synchronous update of data.

5. The method according to claim 1, wherein writing data to be transmitted into the smartcard includes implementing, by the smart card which is a universal integrated circuit card, access permission authentication of the mobile phone terminal and network authentication through an application USIM preset in the UICC card.

6. The method according to claim 1, wherein the smart card selects an HTTP/HTTPS to connect with the remote management server through the mobile phone gateway.

7. The method according to claim 1, further comprising:
updating, by the remote management server, the smart card web server SCWS in a short message form, to reconfigure the SIM channel, and
instructing the mobile phone gateway to use a safe or an unsafe TCP/IP service port to perform data communication in a short message form.

8. The method according to claim 7, wherein setting UP a mobile phone gateway includes setting up, by the mobile phone gateway, an SIM channel used for communication with the smart card through a bearer independent protocol, wherein each communication channel is distinguished by using a different session identifier SID; all the connection and access data of the client is forwarded to the SID instructed by a corresponding UICC; and the SID physically identifies one SIM channel.

9. The method according to claim 7, wherein setting up a mobile phone gateway includes setting up, by the mobile phone gateway, a communication channel with the remote management server through an HTTP/IP protocol.

10. The method according to claim 7, wherein writing data to be transmitted into the smartcard includes performing, by the mobile phone gateway, recognition and authorization on the remote management server; and performing data verification on the data transmitted by the remote management server.

11. The method according to claim 7, wherein one remote management server corresponds with one or more SIM channels to perform synchronous update of data.

12. The method according to claim 7, wherein writing data to be transmitted into the smartcard includes implementing, by the smart card, which is a universal integrated circuit card, access permission authentication of the mobile phone terminal and network authentication through an application USIM preset in the UICC card.

13. A non-transitory computer-readable medium storing instructions that, when executed by a processor, cause the processor to implement a smart card remote operation by using a BIP protocol and an SCWS, the non-transitory computer-readable medium comprising:
a preset module that, when executed by a processor, causes the processor to set up a mobile phone gateway used for communication between a remote management server and a smart card on a mobile phone;
a startup processing module that, when executed by a processor, causes the processor to control a smart card web server SCWS or a proxy program thereof to instruct the mobile phone to start the mobile phone gateway, through a SIM channel according to a short message, for resetting the smart card web server SCWS transmitted by the remote management server to the mobile phone; monitor and open a local TCP/IP service port through the mobile phone gateway; and await a connection to the remote management server;
a connection module that, when executed by a processor, causes the processor to control the remote management server to locate an IP address of the mobile phone in the network; connect, as a client, the TCP/IP service port monitored by the mobile phone gateway; and set up a connection with the smart card; and
a data update module that, when executed by a processor, causes the remote management server to write data to be transmitted into the smart card through the mobile phone gateway, and receive data information fed back by the smart card through the mobile phone gateway.

14. The non-transitory computer-readable medium according to claim 13, wherein the mobile phone gateway sets up an SIM channel used for communication with the smart card through a bearer independent protocol, and sets up a communication channel with the remote management server through an HTTP/IP protocol.

15. The non-transitory computer-readable medium according to claim 13, further comprising: a recognition and authentication module that, when executed by a processor, causes the processor to perform recognition and authorization on the remote management server through the mobile phone gateway, and to perform data verification on the data transmitted by the remote management server.

16. A system for implementing a smart card remote operation by using a BIP protocol and an SCWS, the system comprising:
　　a preset module, used for setting up a mobile phone gateway used for communication between a remote management server and a smart card on a mobile phone;
　　a startup processing module, used for controlling a smart card web server SCWS or a proxy program thereof to instruct the mobile phone to start the mobile phone gateway through an SIM channel according to a short message for resetting the smart card web server SCWS transmitted by the remote management server to the mobile phone; monitoring and opening a local TCP/IP service port through the mobile phone gateway; and awaiting a connection to the remote management server;
　　a connection module, used for controlling the remote management server to locate an IP address of the mobile phone in the network; connecting, as a client, the TCP/IP service port monitored by the mobile phone gateway; and setting up a connection with the smart card; and
　　a data update module, used for the remote management server to write data to be transmitted into the smart card through the mobile phone gateway, and receiving data information fed back by the smart card through the mobile phone gateway.

17. The system according to claim 16, wherein the mobile phone gateway sets up an SIM channel used for communication with the smart card through a bearer independent protocol, each communication channel is distinguished by using a different session identifier SID, all the connection and access data of the client is forwarded to the SID instructed by a corresponding UICC, and the SID physically identifies one SIM channel.

18. The system according to claim 16, wherein the mobile phone gateway sets up a communication channel with the remote management server through an HTTP/IP protocol.

19. The system according to claim 16, further comprising: a recognition and authentication module, used for performing recognition and authorization on the remote management server through the mobile phone gateway, and performing data verification on the data transmitted by the remote management server.

20. The system according to claim 16, further comprising: a resetting module, used for the remote management server to update the smart card web server SCWS in a short message form to reconfigure the SIM channel, and instruct the mobile phone gateway to use a safe or an unsafe TCP/IP service port to perform data communication in a short message form.

\* \* \* \* \*